United States Patent [19]
Iles et al.

[11] 3,781,749
[45] Dec. 25, 1973

[54] RESISTANCE THERMOMETER ELEMENT

[75] Inventors: Gerald Sidney Iles; Gordon Leslie Selman, both of London, England

[73] Assignee: Johnson, Matthey & Co., Limited, London, England

[22] Filed: Nov. 13, 1972

[21] Appl. No.: 305,657

[30] Foreign Application Priority Data
Nov. 18, 1971 Great Britain .................. 53,655/71

[52] U.S. Cl. ..................... 338/25, 29/612, 117/201, 338/287, 338/292
[51] Int. Cl. ............................................... H01g 7/00
[58] Field of Search ..................... 338/25, 300, 308, 338/287, 292; 117/201; 29/612

[56] References Cited
UNITED STATES PATENTS
| | | | |
|---|---|---|---|
| 2,880,181 | 3/1959 | Williams | 252/514 |
| 2,950,996 | 8/1960 | Place | 338/308 X |
| 3,329,526 | 7/1967 | Daily | 252/514 |
| 3,412,043 | 11/1968 | Gilliand | 252/514 |

FOREIGN PATENTS OR APPLICATIONS
| | | | |
|---|---|---|---|
| 674,484 | 6/1952 | Great Britain | 338/25 |

*Primary Examiner*—E. A. Goldberg
*Attorney*—John W. Malley et al.

[57] ABSTRACT

An electrically resistive element suitable for use as the temperature sensitive element of a resistance thermometer comprising a layer of vitreous material loaded with electrically conducting particles secured to an electrically non-conducting substrate. Preferably the particles are flakes or platelets of platinum. The element includes two tortiles or sinuous paths of the fused vitreous material in side by side relationship and interconnected at one end to form a non-inductive electrically conducting path and in the case of a multi-layered structure, electrically interconnected layers of material are separated by intermediate layers of a dielectric material. A dispersion of the particles and powdered vitreous material in an organic medium is screen printed on the substrate and fired to fuse the vitreous material. The two paths may be printed on the substrate or may be cut by laser beam from a single layer printed on the substrate or intermediate layer. The substrate may form part of the surface of a body whose temperature is to be measured, may be a wafer of alumina, or in the case of a monolithic multi-layered structure, a layer of the dielectric material from which the intermediate layers are formed.

26 Claims, 6 Drawing Figures

PATENTED DEC 25 1973 3,781,749
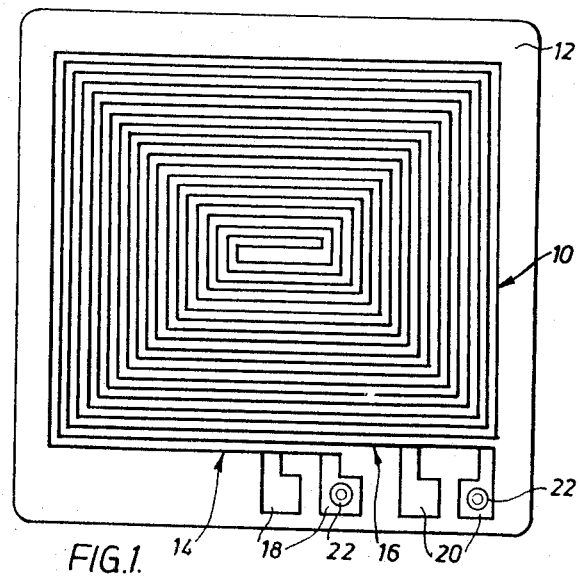
FIG.1.
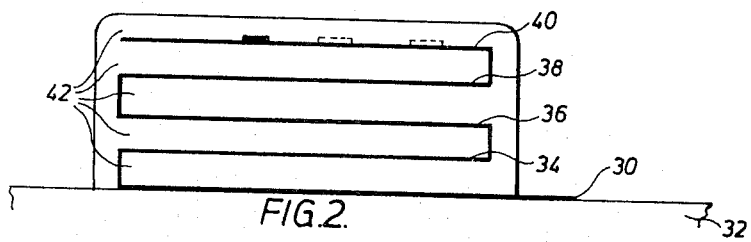
FIG.2.
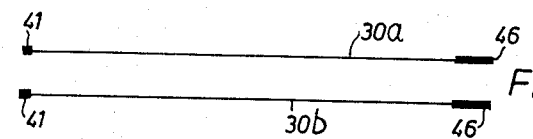
FIG. 3A.
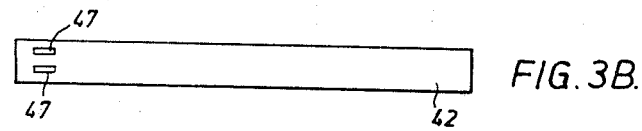
FIG. 3B.
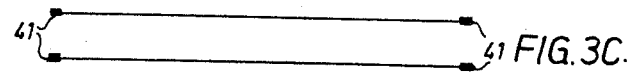
FIG. 3C.
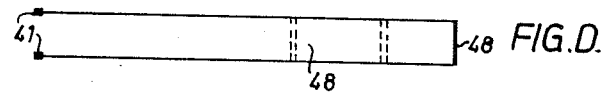
FIG. D.

RESISTANCE THERMOMETER ELEMENT

This invention relates to electrically resistive elements suitable for use as the temperature-sensitive elements of resistance thermometers and to resistance thermometers including such elements.

A resistance thermometer generally comprises a temperature-sensitive element, the electrical resistance of which varies with temperature in a known and predictable manner. In use, the element is connected to means for measuring its resistance and hence for obtaining a measure of its temperature.

It is, in general, at least desirable:

a. for the temperature-sensitive element to be small so that when, for example, it is in contact with a body, it will indicate the temperature of a small area of the body rather than the mean temperature of a larger area;

b. for the temperature-sensitive element to have a low thermal capacity so that its temperature will change readily in response to changes in the temperature to which it is subjected and also so that it will not, in coming to thermal equilibrium with its surroundings or with the body with which it is in contact, extract so much heat that the temperature of the surroundings or of the body is reduced;

c. for the temperature-sensitive element to be of such a shape and size that it may readily be placed in contact with the body whose temperature is to be measured;

d. for the electrically conductive material of the temperature-sensitive element to have a temperature coefficient of resistance (TCR) of not less than +2,000 ppm/° C;

e. for the temperature-sensitive element to be physically robust; and f. for it to be resistant to attack by corrosive fluids.

Some, but not all, of these desirable features are exhibited by the temperature-sensitive elements of conventional resistance thermomenters. Such temperature-sensitive elements generally consist of a frail helix of small diameter platinum wire (typically 0.0007 mils) housed within a protective ceramic tube. The positioning of the helix is such that the majority of the turns of platinum wire are freely suspended within the confines of the protective tube. This is a tedious and somewhat difficult operation requiring considerable skill and care during assembly to avoid unintentionally "short circuiting" adjacent turns. Therefore this process does not lend itself readily to automation in production and accordingly is very "labour intensive." Such a device is expensive to manufacture. The reason for freely suspending the helix is to eliminate any disturbance of the electrical characteristics due to (1) the differential expansion of platinum metal and ceramic and (2) the contamination of the wire by any impurities from the ceramic.

In an attempt to overcome the disadvantages enumerated above and to produce a temperature-sensitive element which was, inter alia, robust, we investigated the use of electrically resistive elements comprising metallic films deposited on non-conducting substrates. To this end films of platinum metal were deposited on to ceramic substrates by vacuum deposition or sputtering techniques forming so called "thin films" — well known as such in the microelectronics industry. However, it was found that the TCR of such films generally did not exceed about one third of the value for pure platinum qiew (+3,910 ppm/° C), which was considerably less than the desirable minimum level of −2,000 ppm/° C. It is thought that this is probably due to a combination of a number of effects, each of which alone could reduce effectively the TCR of the "thin" metal film. (In this context "thin films" are considered to range in thickness from 50A – 10,000A (or 1 micron)). Among such effects are (1) the "pick up" of impurity elements during deposition of the metal; (2) anastomosis in the film; and (3) mis-matching of the coefficients of linear expansion of the substrate and metal film, which causes strains to be set up in the latter during changes in thermal environment. The electrical characteristics of thin films are dependent not only upon the inherent electrical properties of the metal, but also upon the conduction mechanism within the substrate material. The latter mechanism is complicated and has been the subject of much work by many investigators and is considered in many books and papers on the subject. A suitable reference is "Thin Film Microelectronics" edited by L. Holland, F.Inst.P. Chapter One. Suffice it to say here that the overall value of the TCR of thin metallic film has been found to be much lower (i.e., more negative) than that of the bulk metal as shown in Table 1, p.12 of the above reference.

In view of the disadvantages associated with thin metal films, we next turned our attention to composite metal glass films deposited on non-conducting substrates. In particular we investigated composite metal/glass films formed by the well known screen printing and firing technique which is well established in the "thick film" branch of microelectronic technology. TCR's well in excess of the desired value, and generally about +3,000 ppm/° C (i.e., about 75 percent of the TCR of the bulk metal) were invariably obtained using platinum as the metal component of the composite material. Films of metal, deposited in the same manner but without a glass phase, showed lower TCR values of about +2,400 ppm/° C, substantially the same as those obtained from the best platinum "thin" films shown in Table 1 of the above reference.

It is thought that the perhaps surprising high value of the TCR of +3,000 ppm/° C for a composite film, substantially less pure than platinum metal alone, is explained, partially or completely as follows:

1. The glass phase in the composite film efficiently wets the metal particles and substrate, during the firing process, and provides a firm bond between the metal film and substrate.

2. This overcomes thermal mis-matching difficulties between metal and substrate due to its inherent "structureless" or vitreous nature.

3. The presence of the glass phase surrounding the electrically conducting paths of sintered metal particles, in that part of the composite film close to the substrate, prevents metal to metal contact during thermal elevation, shown by a lowering of the overall resistance and an apparent decrease in TCR.

4. The "impurity level" of the composite system is so high, by virtue of the necessity of incorporating glass into the system, that contamination of the metal by "pick up" during processing stages is virtually negliglible in affecting the magnitude of the TCR.

5. Stresses and strains are relieved, in the composite metal/glass structure, by the somewhat spongy nature of the sintered metal particles in the film. This allows minor structural changes to take place without overall effect on the electrical characteristics of the temperature sensing devices.

According to one aspect of this invention an electrically resistant element suitable for use as the temperature sensitive element of a resistance thermometer comprises a layer of fused vitreous material loaded with electrically conducting particles and secured to a substrate for electrically non-conducting material.

According to another aspect of this invention a method of making an electrically resistive element for use as the temperature sensitive element of a resistance thermometer comprises the steps of applying a layer of a dispersion of electrically conducting particles and powdered vitreous material in an organic medium to the surface of an electrically non-conducting substrate, and heating to drive off the organic medium and fuse the glass.

The non-conducting substrate may be a wafer of alumina or other heat resistant material. Alternatively, it may be part of the surface of a body whose temperature it is required to measure.

The conducting phase may be a metal chosen from gold, silver, platinum, palladium, rhodium, iridium, ruthenium, the so-called "noble" and platinum group metals and iron, cobalt, nickel and copper. By suitably adjusting the atmosphere in the firing process, the various metals can be accommodated, depending upon their oxidation characteristics. The preferred metal is platinum.

In one form the conductive particles are small flakes or platelets of platinum.

Preferably, the layer is formed on the substrate by applying a disperion of platinum flakes and suitable powdered glass in an organic medium and heating so as to drive off the medium and fuse the glass powder.

The dispersion may be screen printed onto the substrate in the form of two tortile paths in side by side relationship and interconnected at one end to produce a non-inductive array. Preferably, the two tortile paths take the general form of a reentrant spiral.

In another embodiment the element is multilayered and comprises a plurality of superimposed layers of the said fused vitreous material, separated by intermediate layers of dielectric material, adjacent layers of the fused vitreous material being interconnected at one end to form a sinuous electrically conducting path.

Preferably each of the said plurality of superimposed layers and the interconnections between adjacent layers are divided into two to form two sinuous electrically conducting paths in side by side relationships, the two paths being electrically interconnected at one end.

In an alternative monolithic form the substate may comprise a layer of the dielectric material from which the intermediate layers are formed.

Embodiments of the invention will now be described by way of example with reference to the accompanying drawings of which:

FIG. 1 shows a reentrant spiral pattern of fused vitreous material printed on a substrate;

FIG. 2 shows one form of multilayered resistive element according to the invention; and FIGS. 3A to 3D show four screen patterns for use in preparing a multilayered resistive element according to the invention.

A dispersion of flake platinum and glass flux in an organic medium was prepared and then ground on a triple roll mill until the particle size, as shown by a fineness of grind gauge, was not more than 6 microns. A suitable composition of the suspension was as follows:

| | |
|---|---|
| Platinum flake ($\not> 10\mu$) | 30.0 g |
| Powdered lead borosilicate glass | 3.5 g |
| Ethyl cellulose medium | 11.0 g |
| Butyl carbitol acetate thinners | 6.0 g |
| Total | 50.5 g |

After treatment on the triple roll mill, the resulting composition or "ink" was used to print a rectangular, reentrant spiral pattern via a stencil supported on a stainless steel screen on to one surface of each of 100,1 in. × 1 in. fused alumina substrates with the lines of each rectangular spiral pattern substantially parallel to the edges of the substrate on which it was printed. The fused alumina stock used for the substrates was of the type commonly employed in the electronics industry and had a surface finish of about 20 micro-inches CLA. Further, the lines of the pattern printed on the substrates were nominally 0.010 inch wide with a nominal space of 0.010 inch between adjacent pairs of lines and the total length of the lines of each pattern varied from 35 inches down to about 5 inches depending upon the pattern used. Finally, the thickness of the lines was found to be in the range 12.5 ± 2.5 microns.

After printing, the patterns were allowed to "level" or flow out at room temperature for about 15 minutes and then dried by infra-red radiation. Following this, the substrates were fired by passing them through a conveyor furnace with peak temperature in the range 750° to 1,050° C. A standard bell-shaped temperature profile was used and the substrates passed through the furnace in about 60 minutes.

FIG. 1 shows the pattern 10 of ink in the form of a reentrant spiral, printed on a fused aluminum substrate 12.

The ends of the printed rectangular spirals 14 and 16 terminated in enlarged rectangular areas or "lands" 18 and 20 respectively and an electrical connection was made to each of them by passing a nail-headed 0.020 inch diameter platinum wire 22 through a hole drilled in the centre of each land so that the nail "head" was in contact with the land, a coating of platinum ink was applied to each nail head and land and then each assembly was refired at about 850° for 10–60 minutes in a box furnace. Any other suitable means, such as welding, brazing or soldering could have been used to make the electrical connection.

The resulting alumina substrates, each carrying a fired-on rectangular spiral pattern of platinum and glass and each provided with platinum connecting wires, each constituted an electrically resistive temperature sensing element according to the invention.

Next, a number of these resistive elements was selected and connected to a constant current source the output of which was controlled to within about 100 ppm and attentuated to give a current of about 1mA. The voltage generated across the element, which was, of course, proportional to the resistance of and hence dependent upon the temperature of the element, was monitored by a potentiometer. The element was housed within a cubical Inconel shield within a tubular furnace. The temperature of the furnace was monitored by means of a Pt/13 percent Rh-Pt thermocouple and the temperature within the shield itself by means of a conventional resistance thermometer.

Initially, the assembly of thermometers and the thermocouple was allowed to "soak" at a temperature of 600°C for about 70 hours and, following this, was submitted to six thermal cycles between room temperature and about 300°C with a period of thermal soaking at the conclusion of each half cycle. Heating and cooling curves were plotted using the thermocouple and the wire wound resistance thermometer as the temperature standards. Good agreement was obtained between successive heating and successive cooling curves and there was no evidence of any hysteresis.

From the heating and cooling curves, six values of $R_{100}$ (the resistance of the element at 100°C) were obtained and also six values of $R_0$ (the resistance at 0°C) by extrapolation of the curves.

The mean value of $R_0$ was 304.67 ohms with limits of +0.02 and −0.01 ohm. The corresponding figures for $R_{100}$ were 397.06, +0.05 and −0.07.

These figures show that the value of $R_{100}$ and $R_0$ and hence the ratio $R_{100}/R_0$ remained essentially unchanged as a result of the thermal cycling to which the element was subjected so that the expression $R_{100}/R_0$ = constant held for the fired-on ink layer of the elements under test. Later tests, using data for $R_0$ obtained at 0°C directly, confirm the expression $R_{100}/R_0$ = constant. The figures further indicate that the temperature coefficient of resistance of the fired-on film was in excess of +3,000 ppm.

The corresponding resistance values for the wirewound resistance thermometer were:

$R_0$ : 100.067 : +0.009 , −0.014
$R_{100}$ : 138.57 : +0.02 , −0.01

It is essential that the expression $R_t/R_0$ = constant should hold to within close limits (especially for $t$ = 100°C) for any given element according to the invention if it is to be suitable for use as the temperature-sensitive element of a resistance thermometer. It is also necessary for the expression to hold equally well for all the elements printed from a given batch of ink if the ink is to be suitable for use in the manufacture of reliable elements.

The tests described above showed that the chosen element satisfied the above condition and, subsequently, similar tests on others of the 100 temperature-sensitive elements and subsequent patterns showed that they also exhibited essentially stable values of $R_{100}/R_0$ and that none of them showed signs of hysteresis during temperature cycling.

Whilst elements produced by the method outlined above are "small," the area over which they must extend in order to allow the required resistance value to be obtained, preferably 100 ohm, is limited by the minimum line width and line interspacing which can be satisfactorily printed. For example, in order to accommodate an element 0.010in. wide within a 0.10 × 1.0 inch rectangular area and having a resistance value of not less than 100 ohm, it is necessary to have a current path length of about 1,200 squares. (The resistivity of a conductive system is usually expressed in terms of area or "sheet" resistivity in the microelectronics industry, the units being "ohm/square." It is tacitly assumed that the films are of the same thickness. Since the area considered has a square configuration, the fact that resistance is proportional to length but inversely proportional to width, causes the unit dimensions to cancel each other, therefore the expression is in effect "ohm per square of any dimension"). Thus, for squares of side (and length) 0.01 inch, 1,200 such squares require an effective length of 12 inches. Assuming an interline spacing of 0.010 inch and 12 lines on the 1.0 inch long substrate, 12 × 0.01 inch are required for total line widths and 13 × 0.010 inch are required for interline and margin spacings giving an overall total width for the substrate of 0.25 inch. Similarly, if the line width was reduced to 0.005 inch then an effective length of 6 inches would be necessary to produce a resistance value of about 100 ohm. With an interline and margin spacing of 0.010 inch the pattern could just be accommodated within the prescribed area but without adequate room to site the land area upon which to bond the wire terminations. Reduction of the interline spacing to 0.005 inch does not afford a great deal of gain, since the terminal lands would have to be sited on the long side of the 0.1 × 1.0 inch area and difficulties would be encountered in designing a means of leading the terminal wires away from the element without short circuiting the element or substantially adding to the bulk of the sensing element.

Even with line widths of 0.003in. with interline spacing of 0.005in. making 0.008in. between centres, which is about the practical limit for consistent printing, there is insufficient space in a 0.1in. × 1.0in. area to allow 100 ohm to be consistently achieved.

Apart from these difficulties, there are the practical difficulties of the printing and firing process in maintaining electrical continuity in the 0.003 inch resistor tracks and electrical insulation between adjacent tracks, i.e., preventing ink from flowing across the 0.003 inch interline gaps. If an ink possessing low flow characteristics, usually by raising the "solids content" of the ink, is proposed, then the density and subsequent electrical quality of the resistance element suffers from the lack of flow in the ink, which fails to allow the discrete deposits of ink to unite efficiently after the printing process. In order to be certain of maintaining electrical continuity in a track of width 0.003 inch and electrical insulation between tracks, using a conventional mesh and stencil to locate and dispense ink onto a substrate, it is necessary to closely control the rheological properties of an ink if any degree of confidence in the integrity of the printing stage is to be expected. Since the track must of necessity change its direction a number of times through at least 90° in order to be accommodated within the prescribed area and since during manufacture of the screen the mesh takes on some degree of distortion from its original squareness, 100 percent correspondence between pattern and mesh opening cannot be guaranteed throughout the entire area. It is not uncommon to find three sides of a rectangular pattern, each as used here, in good agreement with the linearity of the mesh and the fourth side in disagreement. This fourth side is usually a source of error or fault in subsequent use. This is one of the limitations in this technology which has to be accepted at the present level of technical skill.

The use of etched metal masks, in which the desired pattern is etched into 50 percent of the thickness of the mask from one side and "feeder holes" are etched through the remaining 50 percent from the other side, should theoretically overcome the limitations of the conventional screen mesh and stencil. However, patterns designed down towards these dimensions have not successfully overcome the limitations outlined above. In fact other difficulties which have arisen are (1) the difficulty in physically controlling the etching process to produce the required dimensions in the mask, and (2) the failure to attain good electrical integrity in the deposited film, which tends to consist of a series of mounds of metal tenuously joined by thin porous areas, similar in appearance to a "string of sausages."

This difficulty can be overcome in any one of three ways outlined below. Each has its own advantages but it will be seen that where it is desirable to achieve higher track resistance values than the nominal 100° considered here, either of the multi-layered methods are to be preferred over simply connecting ten 100 ohm units in series, on packing density, robustness and economic grounds.

It has been found that laser cutting resistance tracks, in an area of fused vitreous material can be performed consistently to smaller dimensions and closer tolerances than the conventional screen printing technique allows. Thus the difficulties outlined above can be overcome and elements possessing tracks of resistance value ($R_0$) of 100 ohm ±0.1 percent at 0° C can be achieved with the minimum of rejects, since every unit is cut from a very low resistance up to the target value during continuous monitoring.

The use of this technique transfers the "skill" from the printing to the calibration stage, which since it is electromechanical in operation, is better able to handle specifications to close limits of tolerance. By inference therefore the screen printing stage, apart from being set up correctly initially, is virtually inspection free since only relatively large metallised block areas are required.

Apart from the advantages to be obtained over conventional screening printing to 100 ohm value, multilayering, in either of the two forms to be described, offers another advantage.

In order to compensate for the resistance of the conducting wires from the sensor unit to the measuring equipment, which in long runs can be quite considerable, various techniques, such as four-terminal, three-terminal, and compensating loop methods of measurement, have to be adopted to reduce the effect of measurement errors. The necessity to adopt such procedures would be negated, if the resistance values of sensors were increased by an order of magnitude to, say, 1,000 ohm.

This is impossible in conventional wirewound platinum resistance thermometers on the grounds of dimensions of the resistance wire (already as low as possible practically); dimension of the finished unit (must not exceed existing size) and cost.

Such objections can be overcome by combining the laser beam track cutting technique with either multilayering technique to build up a sensor unit of 1,000 ohm minimum at a comparatively low cost.

With a multilayering technique, the need to change direction on the stencilled pattern and the necessity for multiple parallel tracks closely spaced laterally is obviated. It is quite easy to make a resistive element within an area of 0.05 sq. in. (i.e. boundaries of 0.05 × 1.00 inch) by using a series of simple patterns, well within the scope of conventionally stencilled meshed screens, without recourse to expensive metal masks.

FIG. 2 shows a multilayered resistive element according to this invention in which a ground or bottom electrode layer 30 is printed onto a substrate 32 which may form part of a body whose temperature is to be measured or may be e.g. a wafer of alumina. Four further electrode layers, 34, 36, 38 and 40 interconnected by pads 41 are superimposed upon the layer 30 and separated by layers of dielectric material 42. A further layer 44 of dielectric material 46 covers the uppermost electrode layer 40.

In an alternative monolithic form the substrate may be a layer of dielectric material integral with the dielectic layer 42.

One method of producing such a multilayered structure is to prepare four screens each bearing a pattern for printing one of four different kinds of layer together with special marks to aid registration of successive prints. FIGS. 3A to 3D show these four different kinds of layer.

The ground or bottom electrode layer 30 (FIG. 3A) is in the form of two separate layers or tracks 30a and 30b each having a pad 41 for connecting the layer 30 to the adjacent layer 34 and a land 46 through which electrical connection is made to the element. Over the electrode layer 30 is printed a di electric layer 42 (FIG. 3B) in which is formed windows 47 corresponding in position to the pads 41. The multilayered structure is then built up by alternately printing further electrode layers (FIG. 3C), having pads 41 at each end, those at one end connecting with the ground layer 30 and those at the other end connecting with a higher electrode layer, and dielectric layers 42. The windows 47 in a dielectric layer are at the opposite end to the windows in an adjacent dielectric layer and this may be achieved merely be reversing the screen corresponding to the pattern of FIG. 3B. In this way two sinuous electrically conducting paths are built and these paths are interconnected by a connecting link 48 in the uppermost electrode layer (FIG. 3D). The connecting link 48 may be located in any desired position along the layer (as shown dotted) and the resistance value is adjusted before overglazing with a final dielectric layer.

The number of electrode layers is determined according to the desired resistance value for a particular element.

Preferably each layer is fired before a further layer is overprinted.

Alternatively, the electrode layers may be formed by printing over the whole area, firing the layer and then cutting the separate layers or tracks (30a and 30b) by laser beam, and subsequently overprinted by layers of dielectric material with suitably positioned windows.

In the case of monolithic elements the dielectric material may be in the "green" state and firing carried out as a single operation at the end of the stocking process.

Laser beam cutting can take place before or after final firing.

We claim:

1. A temperature sensitive device comprising at least one temperature sensitive element, each temperature sensitive element consisting essentially of a substrate made from an electrically non-conducting material and two adjacent electrically conducting tortile paths in side by side relationship disposed on the surface of the substrate and interconnected at one end to establish electrical continuity therebetween, each path consisting essentially of fused vitreous material containing electrically conducting particles applied to the substrate, the electrically conducting particles being made from a metal selected from the group consisting of gold, silver, the platinum group metals, iron, nickel, cobalt and copper.

2. An element according to claim 1, wherein the particles comprise flakes or platelets of platinum.

3. An element according to claim 1, wherein the fused vitreous material comprises lead borosilicate glass.

4. An element according to claim 3, wherein the substrate comprises a wafer of alumina.

5. An element according to claim 3 wherein the substrate is part of the surface of the body, the temperature of which is to be measured.

6. An element according to claim 1, wherein the tortile paths take the general form of a spiral.

7. An element according to claim 1 comprising a plurality of superimposed layers of the said fused vitreous material, separated by intermediate layers of dielectric material, adjacent layers of the fused vitreous material being interconnected at one end to form a sinuous electrically conducting path.

8. An element according to claim 7 wherein each of the said plurality of superimposed layers and the interconnection between adjacent layers, are divided into two to form two sinuous electrically conducting paths in side by side relationship, the two paths being electrically interconnected at one end.

9. An element according to claim 7 wherein the substrate is part of the surface of the body, the temperature of which is to be measured.

10. An element according to claim 7, wherein the substrate comprises a wafer of alumina.

11. An element according to claim 7, wherein the substrate comprises a layer of the dielectric material from which the said intermediate layers are formed.

12. An element according to claim 1 and comprising a land on the other end of each path for providing electrical connection with the electrically conducting paths.

13. A method of making a temperature sensitive device including at least one temperature sensitive element, each temperature sensitive element being made by applying to an electrically non-conducting substrate a layer of a composition consisting essentially of a powdered vitreous material and a powdered electrically conducting material dispersed in an organic medium, the electrically conducting particles being made from a metal selected from the group consisting of gold, silver, the platinum group metals, iron, nickel, cobalt and copper, heating the substrate and the said layer to drive off the organic medium and fuse the glass and, thereafter, removing material from the said layer to form on the substrate two electrically conducting and adjacent tortile paths which are in side by side relationship and interconnected to establish electrical continuity therebetween.

14. A method according to claim 13, wherein the particles comprise flakes or platelets of platinum.

15. A method according to claim 13, wherein the vitreous material comprises lead borosilicate glass.

16. A method according to claim 13, wherein the organic medium comprises ethyl cellulose.

17. A method according to claim 13 comprising the step of screen printing the said dispersion onto the substrate in the form of two tortile paths in side by side relationship and interconnected at one end.

18. A method according to claim 17, wherein the said tortile paths take the general form of a reentrant spiral.

19. A method according to claim 13 and comprising screen printing the layer of the said dispersion covering one or more areas of the substrate and cutting the said layer with a laser beam to form two tortile paths in side by side relationship and interconnected at one end of the said paths.

20. A method according to claim 20 comprising screen printing the layer of the said dispersion onto the substrate, overlaying the said layer with a layer of dielectric material including a window in an end portion thereof, screen printing a further layer of said dispersion over the dielectric layer such that some of the dispersion fills the window thereby connecting together the layers of dispersion and continuing to print alternate layers of dielectric material and said dispersion to build up a stack in which adjacent layers of said dispersion separated by intermediate dielectric layers, and connected together so as to form a sinuous electrically conducting path.

21. A method according to claim 20, wherein each of the said layers of dispersion comprises two paths in side by side relationship, each path in a layer being connected to a corresponding path in an adjacent layer through a window in an intermediate dielectric layer, thereby forming two sinuous electrically conducting paths in side by side relationship and wherein the two paths are interconnected at one end.

22. A method according to claim 20, wherein the two paths in a layer are cut by laser beam from a single layer printed on the substrate or an intermediate dielectric layer.

23. A method according to claim 20, wherein firing of each layer is effected before it is overlaid by a further layer.

24. A method according to claim 20 wherein the substrate comprises a layer of the dielectric material from which the said intermediate layers are formed.

25. A method according to claim 23, wherein the dielectric material is in its "green" state and firing is effected when building of the stack is completed.

26. A resistance thermometer comprising an electrically resistive element according to claim 1.

* * * * *